(12) United States Patent
Noak

(10) Patent No.: US 12,504,176 B2
(45) Date of Patent: Dec. 23, 2025

(54) BAKING OVEN

(71) Applicant: Paul Hettich GmbH & Co. KG, Kirchlengern (DE)

(72) Inventor: Artur Noak, Bad Oeynhausen (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 412 days.

(21) Appl. No.: 18/027,985

(22) PCT Filed: Sep. 6, 2021

(86) PCT No.: PCT/EP2021/074485
§ 371 (c)(1),
(2) Date: Mar. 23, 2023

(87) PCT Pub. No.: WO2022/063557
PCT Pub. Date: Mar. 31, 2022

(65) Prior Publication Data
US 2023/0375188 A1    Nov. 23, 2023

(30) Foreign Application Priority Data

Sep. 24, 2020   (DE) .................. 10 2020 124 880.6

(51) Int. Cl.
*F24C 15/16*    (2006.01)

(52) U.S. Cl.
CPC ................... *F24C 15/16* (2013.01)

(58) Field of Classification Search
CPC .... A47B 96/061; A47B 57/425; A47B 96/063
See application file for complete search history.

(56) References Cited

U.S. PATENT DOCUMENTS 2,486,949 A * 11/1949 Hutchison ............... F42B 39/00
                                                    89/34
2,967,625 A *  1/1961 Hoogenstyn ........... A47B 57/08
                                                    211/183
(Continued)

FOREIGN PATENT DOCUMENTS

AT       381622 B    11/1986
DE   101 51 899 C1    4/2003
(Continued)

OTHER PUBLICATIONS

International Search Report in PCT/EP2021/074485, mailed Jan. 10, 2022.
(Continued)

*Primary Examiner* — Jorge A Pereiro
(74) *Attorney, Agent, or Firm* — Collard & Roe, P.C.

(57) ABSTRACT

A baking oven has a baking oven muffle, on which at least one support is arranged on opposite sides and/or a rear wall, on which support a cooking product carrier is supported. A holding device is arranged on the at least one support and secures the cooking product carrier against lifting. The holding device has a movable holding section which, in the position of the cooking product carrier placed on the support, engages over an edge of the cooking product carrier. In this way, the holding device can be used to prevent a tilting movement of the cooking product carrier.

11 Claims, 13 Drawing Sheets

(56) References Cited

U.S. PATENT DOCUMENTS

Figure 1:
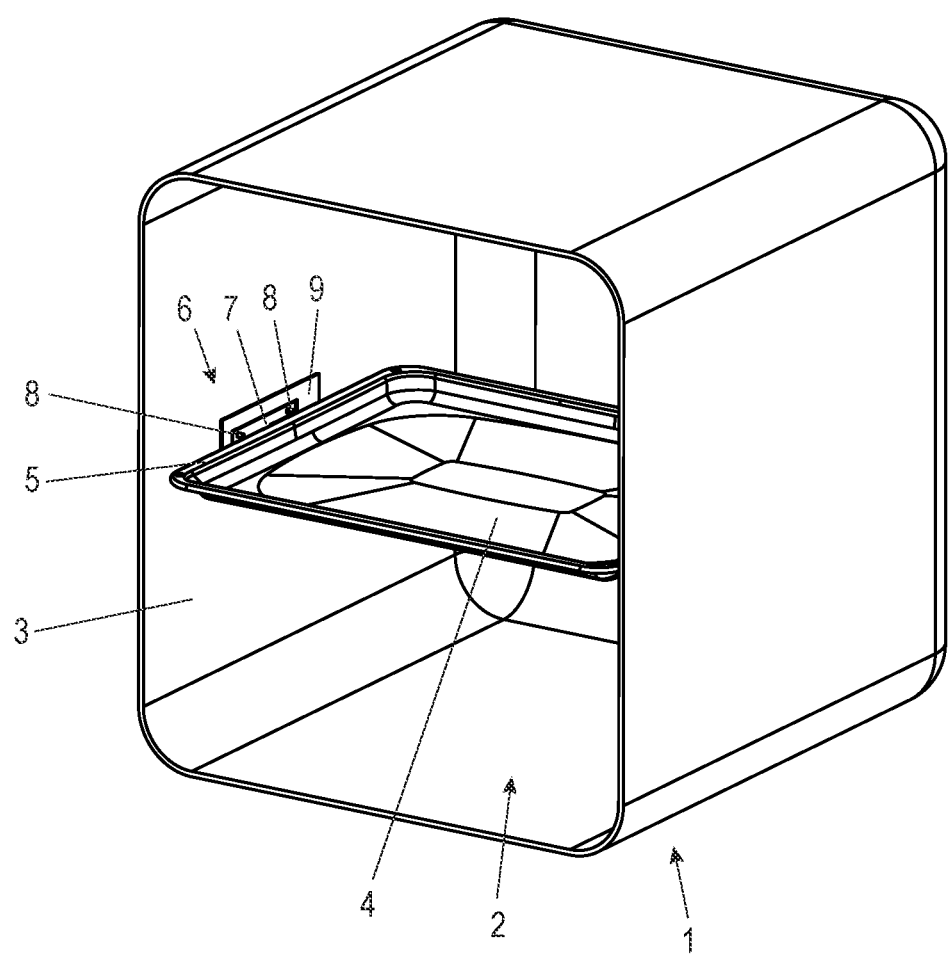

| | | | | | |
|---|---|---|---|---|---|
| 3,471,111 | A | * | 10/1969 | Macdonald | A47B 96/063 108/42 |
| 3,471,112 | A | * | 10/1969 | Macdonald | A47B 96/063 248/250 |
| 4,037,813 | A | * | 7/1977 | Loui | A47B 96/063 248/250 |
| 4,124,016 | A | * | 11/1978 | Miller | A21B 1/26 126/21 A |
| 4,289,289 | A | * | 9/1981 | Overman | A47B 57/34 211/187 |
| 4,359,162 | A | * | 11/1982 | Mayer | B65G 1/14 312/351 |
| 4,666,117 | A | * | 5/1987 | Taft | A47B 96/063 211/187 |
| 4,712,691 | A | * | 12/1987 | Grill | B65G 1/14 211/49.1 |
| 4,732,358 | A | * | 3/1988 | Hughes | A47B 96/068 211/90.01 |
| 4,819,901 | A | * | 4/1989 | McDonald | A47B 57/52 248/250 |
| 4,856,746 | A | * | 8/1989 | Wrobel | A47B 96/063 108/107 |
| 5,080,311 | A | * | 1/1992 | Engstrom | A47B 96/063 248/250 |
| 5,452,813 | A | * | 9/1995 | Grow | A47B 96/06 211/187 |
| 6,186,456 | B1 | * | 2/2001 | Marsh | A47B 96/022 248/250 |
| 6,554,236 | B2 | * | 4/2003 | Marsh | A47B 57/48 248/248 |
| 6,854,379 | B2 | | 2/2005 | Pattle et al. | |
| 10,829,318 | B2 | * | 11/2020 | Kreft | A47F 7/0014 |
| 11,311,143 | B2 | * | 4/2022 | Peter | F24C 15/168 |
| 11,707,133 | B2 | * | 7/2023 | Duggins | A47B 57/485 248/235 |
| 2012/0097147 | A1 | * | 4/2012 | Steurer | F24C 15/16 126/339 |
| 2018/0100687 | A1 | * | 4/2018 | Ammerman | F25D 23/066 |
| 2019/0186756 | A1 | | 6/2019 | Tiefnig et al. | |

FOREIGN PATENT DOCUMENTS

| | | |
|---|---|---|
| DE | 102 41 487 A1 | 1/2004 |
| DE | 10 2009 026 127 A1 | 2/2010 |
| DE | 10 2010 038 607 A1 | 2/2012 |
| DE | 10 2012 218 535 A1 | 4/2014 |
| EP | 3 730 842 A2 | 10/2020 |
| GB | 795765 A | 5/1958 |

OTHER PUBLICATIONS

German Search Report dated Jun. 30, 2021 in German Application No. 10 2020 124 880.6 with English translation of the relevant parts.
EPO—Communication Pursuant to Article 94(3), Dated Mar. 12, 2024 With English Translation.

* cited by examiner

BAKING OVEN

CROSS REFERENCE TO RELATED APPLICATIONS

This application is the National Stage of PCT/EP2021/074485 filed on Sep. 6, 2021, which claims priority under 35 U.S.C. § 119 of German Application No. 10 2020 124 880.6 filed on Sep. 24, 2020, the disclosure of which is incorporated by reference. The international application under PCT article 21(2) was not published in English.

The present invention relates to a baking oven with a baking oven muffle, on which at least one support is arranged on opposite sides and/or a rear wall, on which a cooking product carrier is supported and a holding section is arranged on the at least one support, which secures the cooking product carrier against lifting.

DE 10 2010 038 607 A1 discloses a baking oven on which a cooking product carrier is held in a displaceable manner via two telescopic guides. The cooking product carrier comprises protruding rods on opposite sides that can be latched to a curved plate. Such latching prevents accidental lifting of the cooking product carrier, which can only be lifted from a certain release force that exceeds the holding force of the latching mechanism. This holding device is disadvantageous because the position of the rods on the cooking product carrier and the latching mechanism must be matched to each other, which makes assembly more difficult and also makes it difficult to adapt to different sizes of cooking product carrier.

It is therefore the object of the present invention to provide a baking oven which, by simple means, ensures that the cooking product carrier is fixed against lifting, in particular by a tilting movement.

This object is achieved with a baking oven having the features of claim 1.

In the baking oven according to the invention, a holding device is provided which secures the cooking product carrier against lifting, wherein the holding device comprises a movable holding section which, in the position of the cooking product carrier placed on the support, engages over an edge of the cooking product carrier. The movable holding section can thus be used to secure the cooking product carrier against lifting, which can prevent lifting, particularly when the cooking product carrier is pulled out to a tilting position. The cooking product carrier does not have to be actively latched onto a latching mechanism to secure it, but can be secured by placing it on the support without any additional effort.

Preferably, the holding device surrounds the edge of the cooking product carrier in the deposited position in a U-shape in the front view. This allows the cooking product carrier to be fixed in position via the holding device, whereby the cooking product carrier can be moved smoothly in the insertion direction. In this case, a lower support surface can be arranged offset from the holding section in the insertion direction, for example the holding section can be arranged closer to a rear wall of the baking oven muffle than the support surface, so that improved protection against tipping is obtained, since the weight force of the cooking product carrier holds the holding section in the locked position.

In a further embodiment, the movable holding section is formed on a pivotable lever. In this case, the pivotable lever can comprise a support surface that can be moved by an underside of the edge when the cooking product carrier is placed on it. This allows the cooking product carrier to be placed on the support surface in a predetermined position to pivot the lever, with a holding section of the lever then being moved over the edge of the cooking product carrier. Then, optionally, the cooking product carrier can still be fully inserted into the oven muffle.

An axis of rotation of the lever is preferably aligned horizontally and parallel to a direction of insertion of the cooking product carrier into the baking oven muffle. The lever can be pivoted between a deposited position and a receiving position, whereby the two end positions are each limited by at least one stop. The lever is preferably biased into the receiving position by at least one spring or by its own weight, so that the lever automatically moves into the receiving position after the cooking tray has been removed. The lever can then be moved by the weight of the cooking product carrier into the deposited position in which the holding section overlaps the edge of the cooking product carrier.

The holding device preferably comprises an axis of rotation for the lever, which is arranged on an outer side on the side of the holding device facing the side wall of the baking oven muffle. This allows the pivot to be protected behind a plate of the holding device, which reduces contamination.

The holding device preferably comprises a support element on which the lever is rotatably mounted. The support element can, for example, be formed as a plate in which a recess is formed for the pivotable lever.

The holding device does not have to be stationary in the baking oven muffle, but in a preferred embodiment can be fixed to a rail of a pull-out guide. Alternatively, the holding device can also be fixed to a side grid in the baking oven muffle, which is optionally extendable or stationary. In this way, securing of the cooking product carrier can also be provided in combination with a pull-out mechanism.

The holding device is preferably made entirely of metal.

Figure 2:
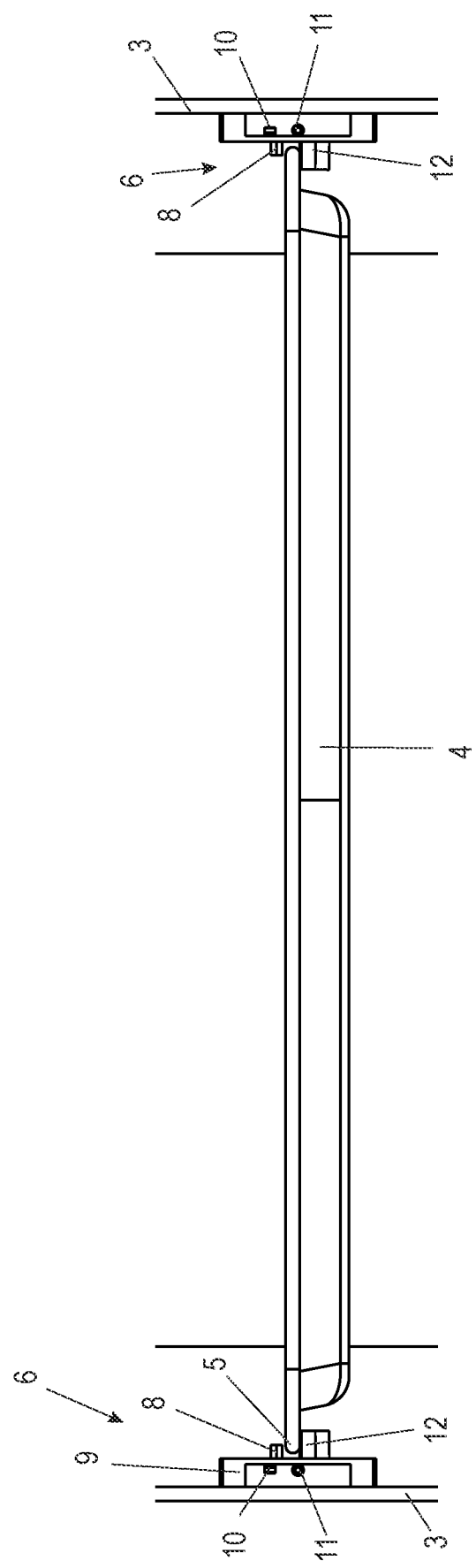
Figure 3:
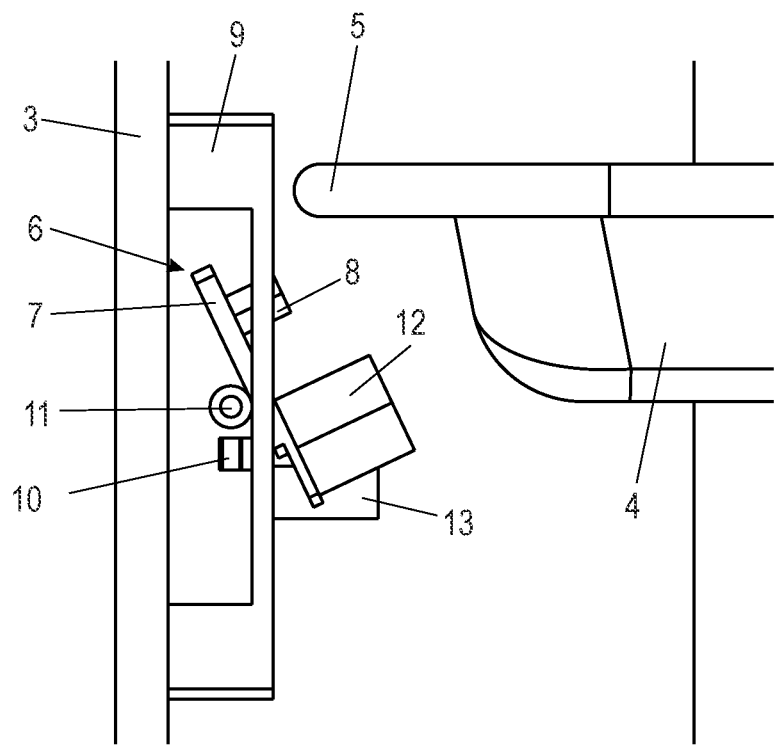
Figure 4:
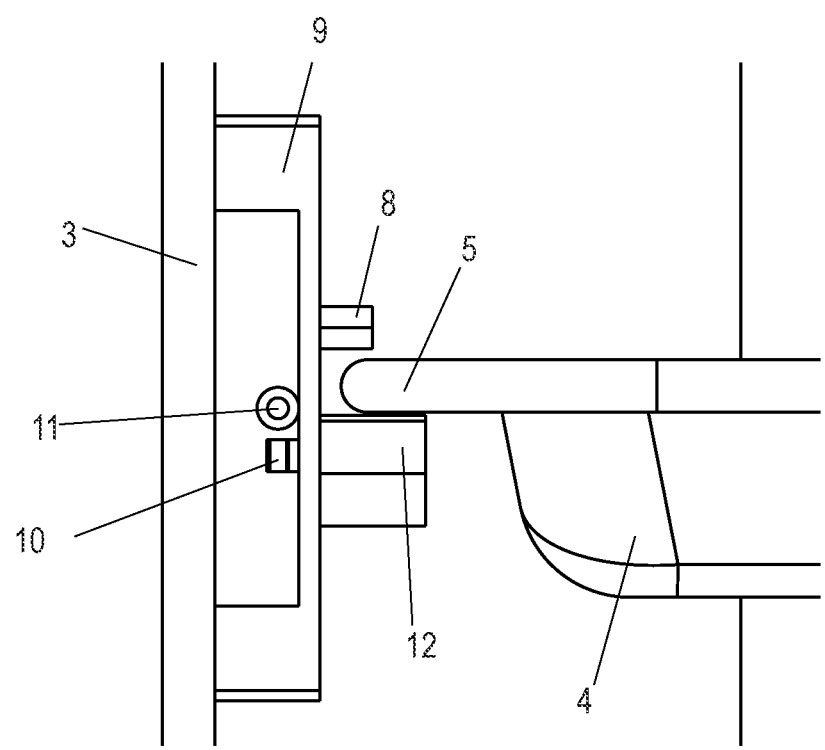
Figure 5:
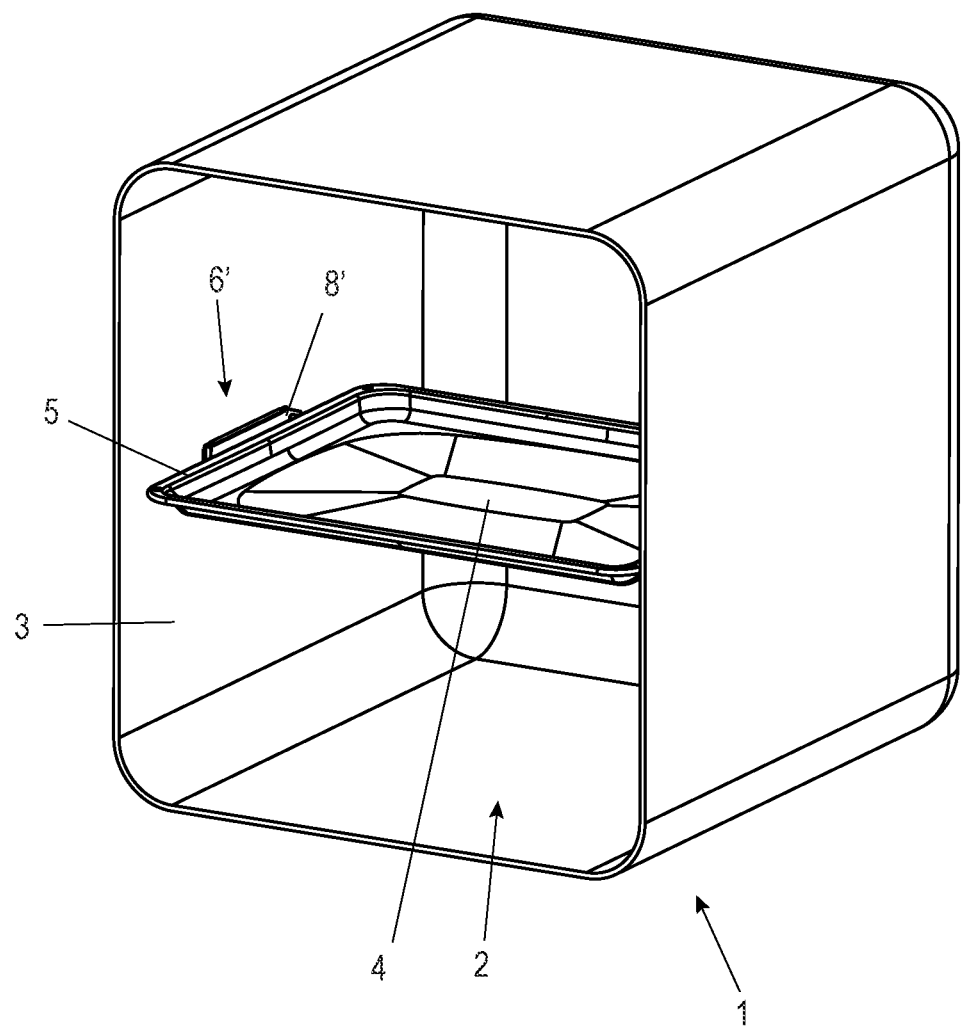
Figure 6:
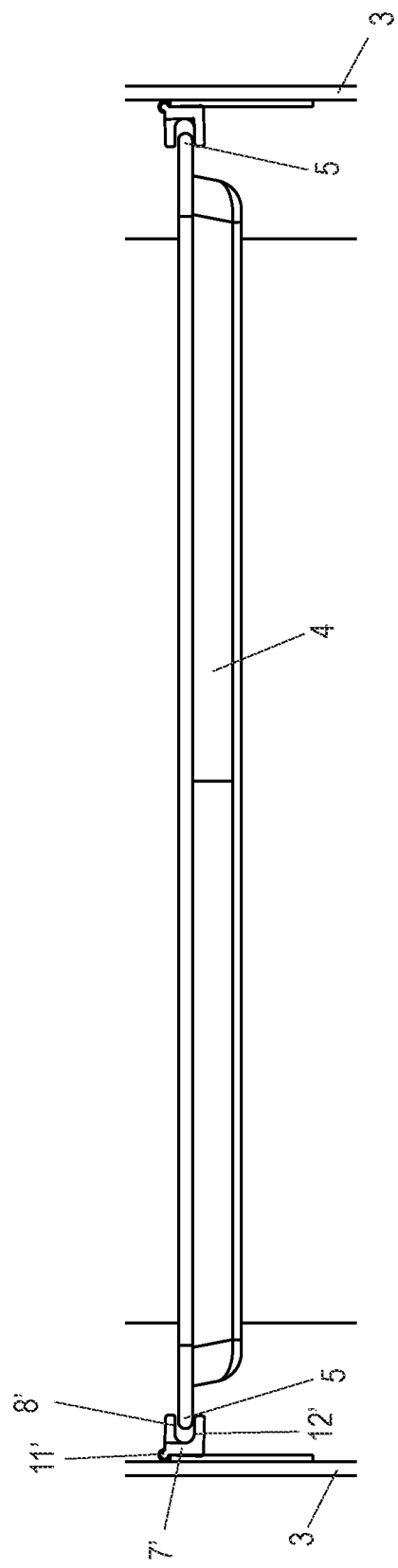
Figure 7:
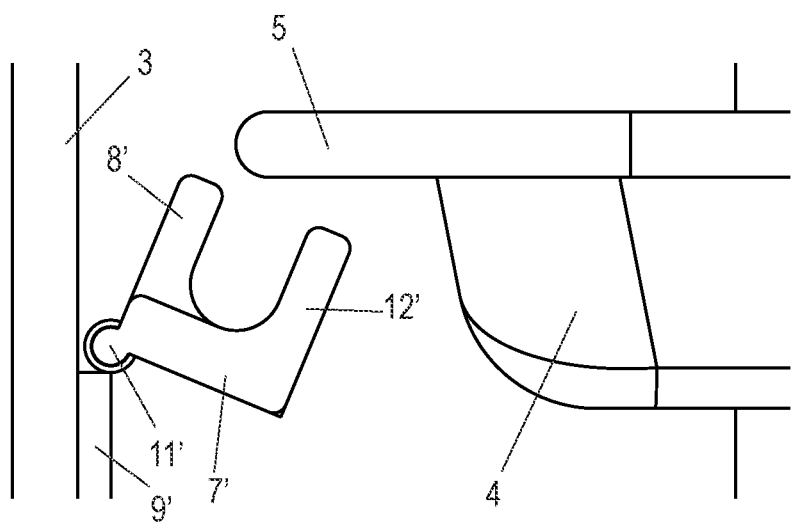
Figure 8:
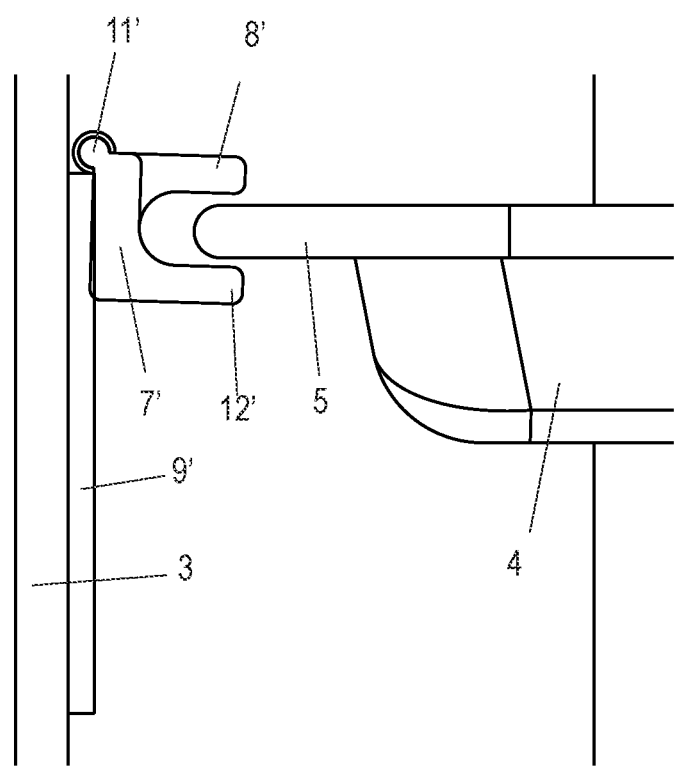
Figure 9:
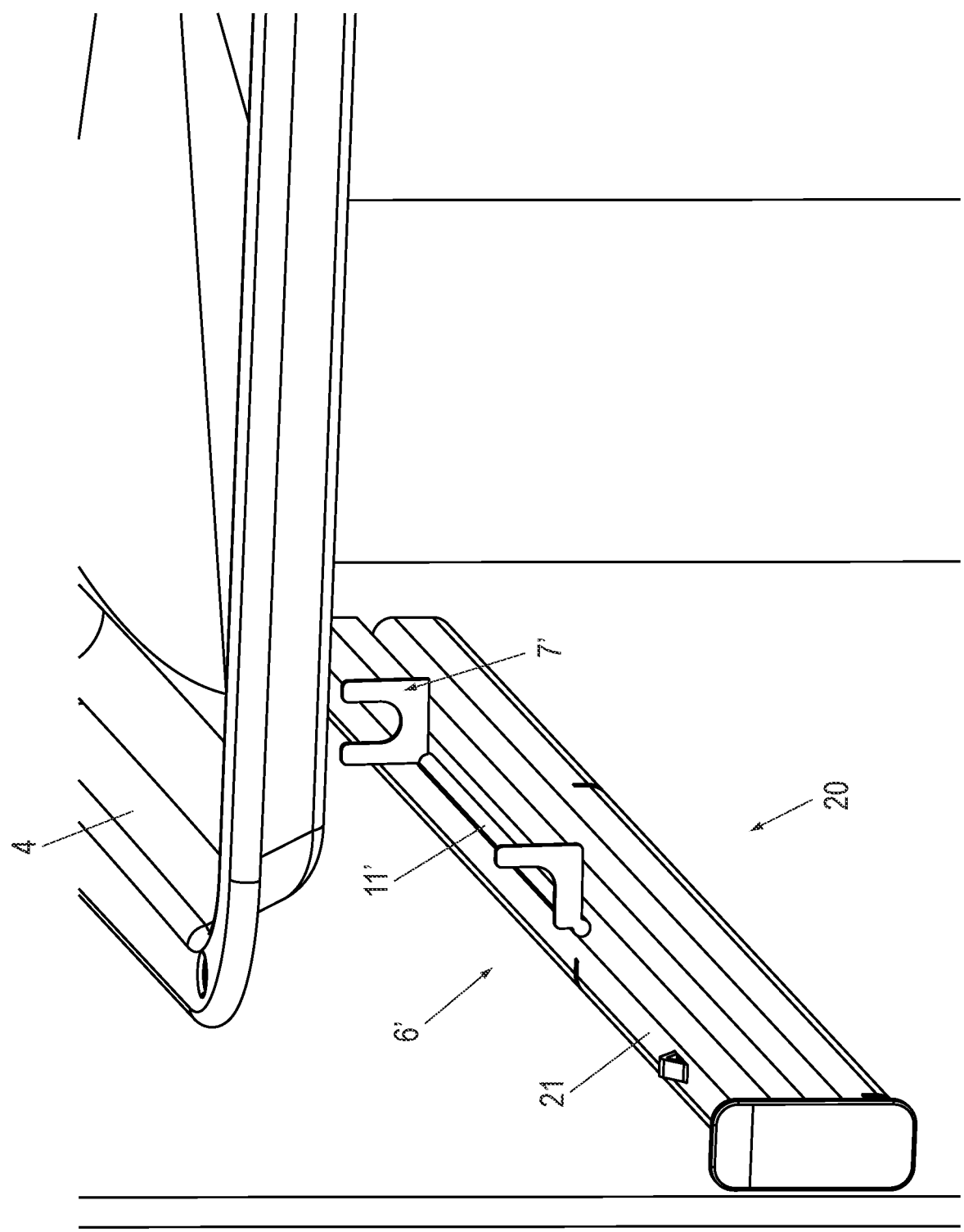
Figure 10:
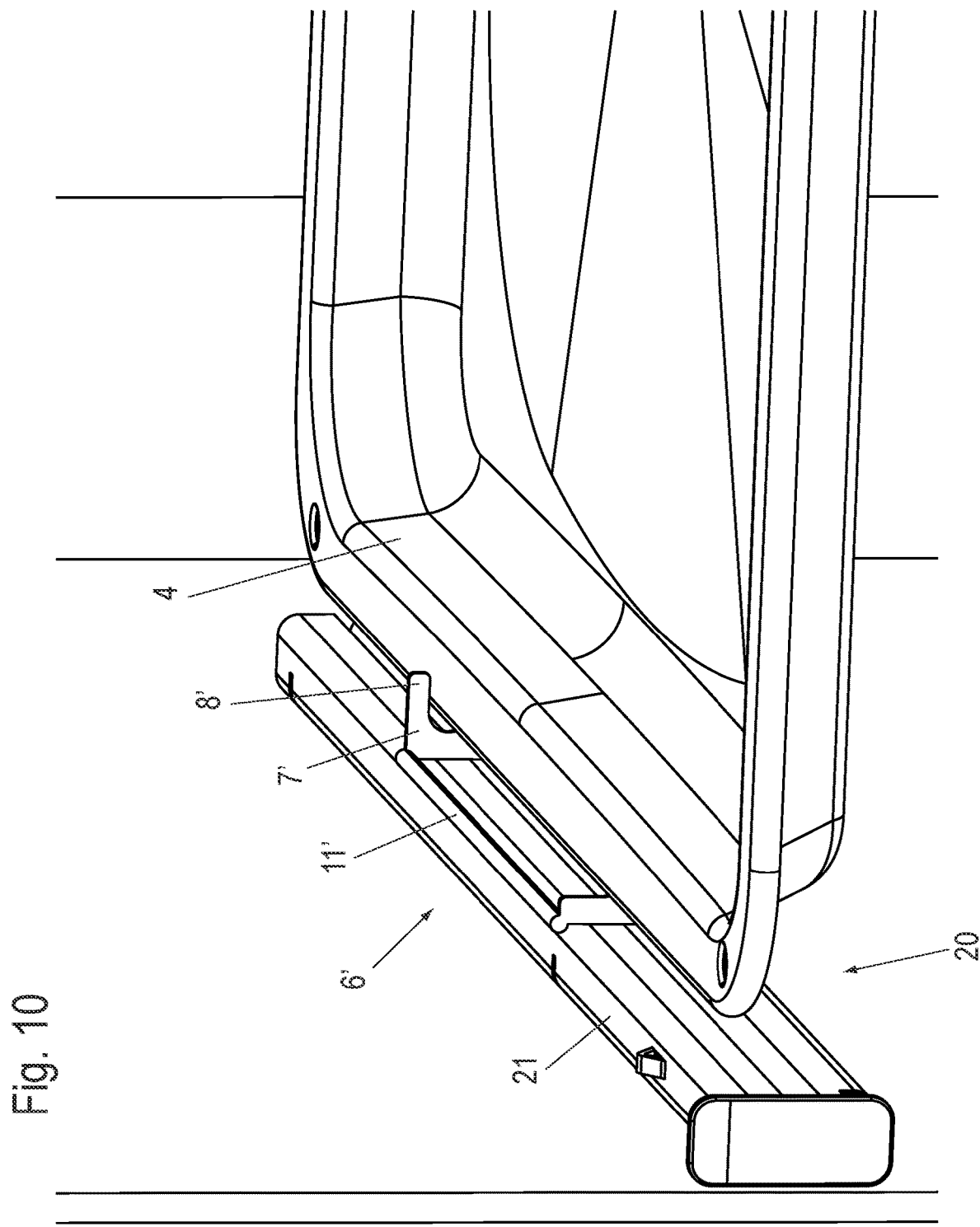
Figure 11:
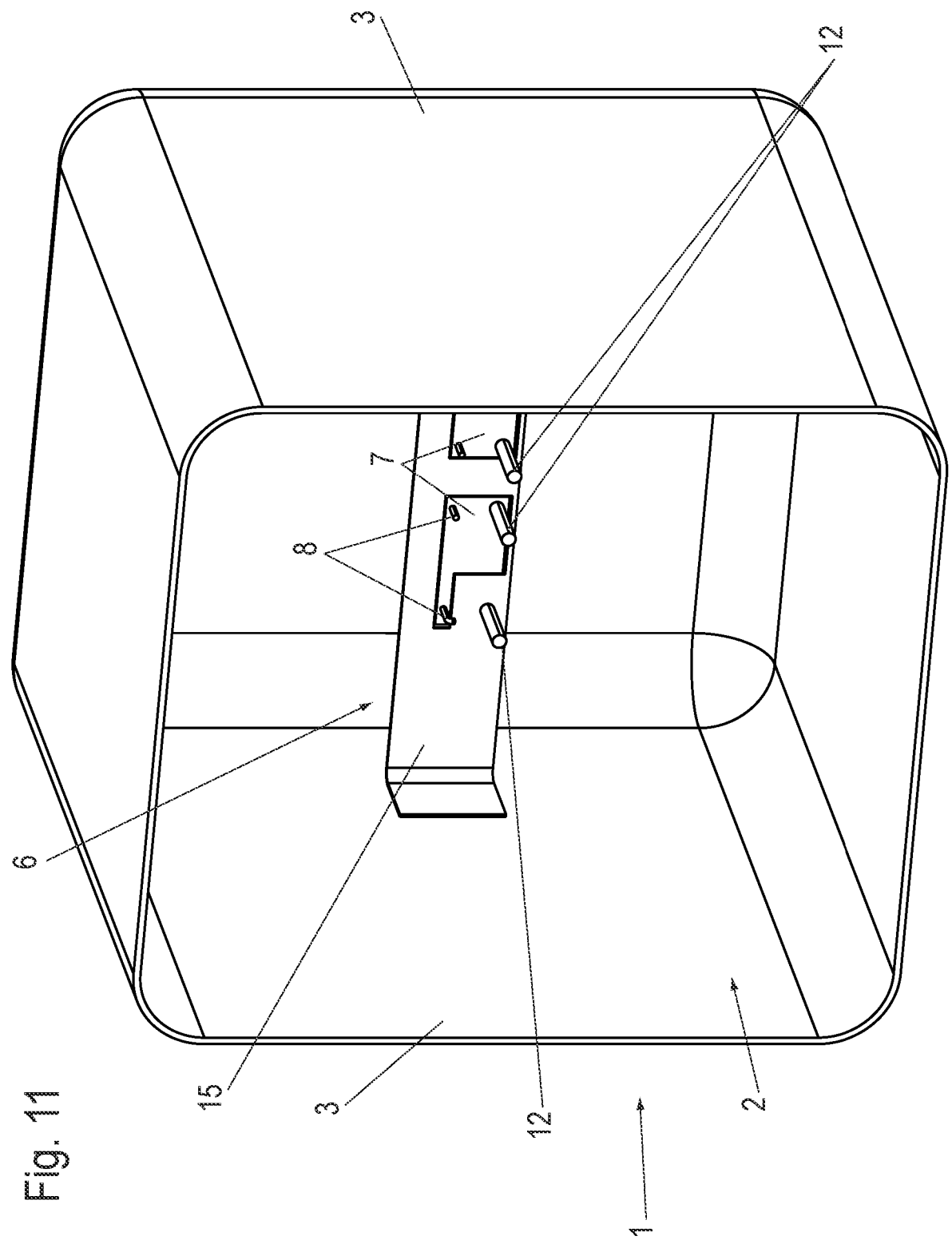
Figure 12:
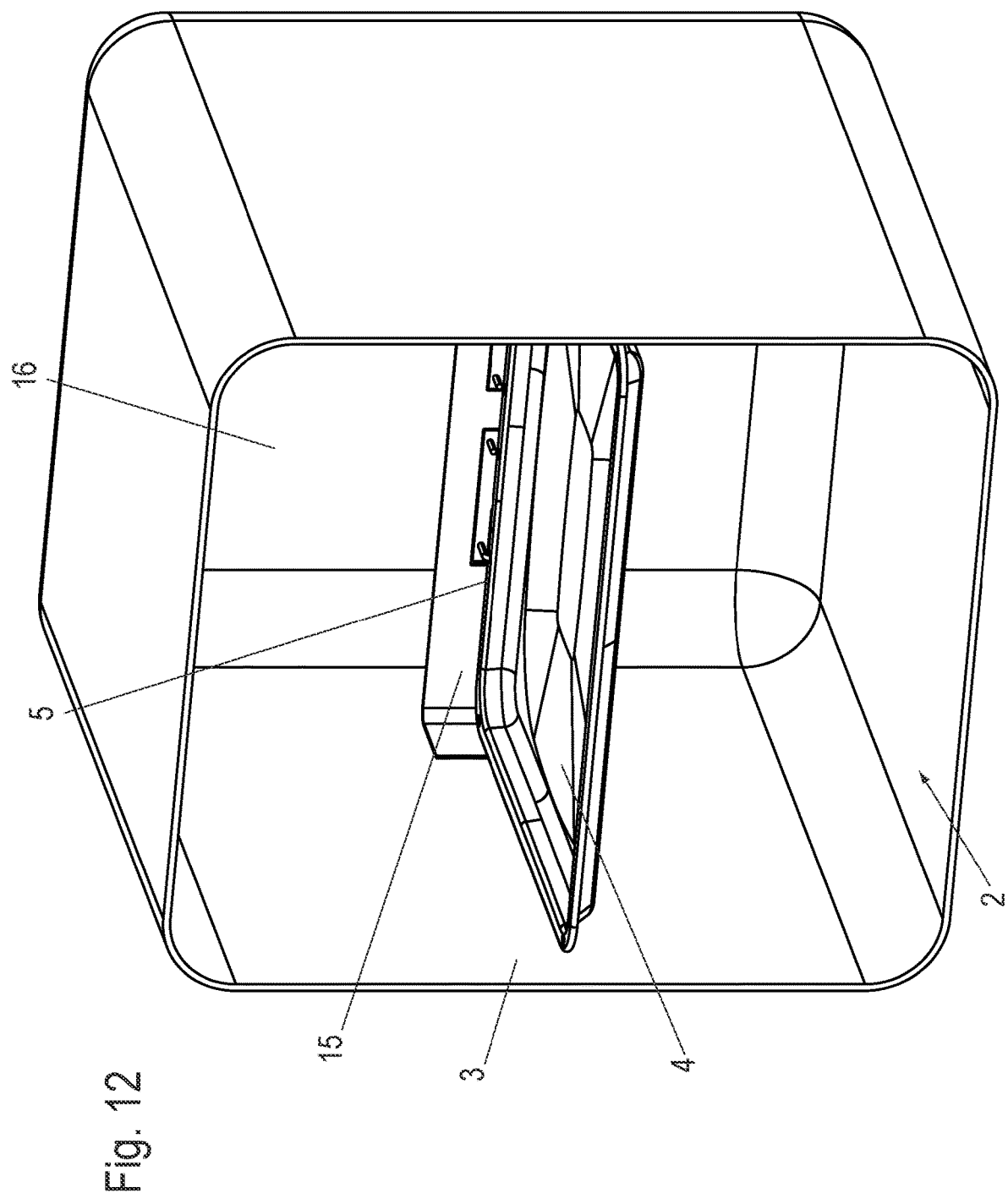

The invention is explained in more detail below by means of two examples of embodiments with reference to the accompanying drawings. They show:

FIG. 1 perspective view of a baking oven according to the invention;

FIG. 2 front view of the cooking product carrier of FIG. 1;

FIG. 3 detailed view of an edge of the cooking product carrier before it is placed on a holding device;

FIG. 4 detailed view after the cooking product carrier has been placed on the holding device;

FIG. 5 perspective view of a second embodiment of a baking oven;

FIG. 6 view of the cooking product carrier of FIG. 5;

FIG. 7 detailed view of an edge of the cooking product carrier before it is placed on a holding device;

FIG. 8 detailed view of an edge of the cooking product carrier after it has been placed on a holding device;

FIG. 9 perspective view of a third embodiment with a pull-out guide and an edge of the cooking product carrier before being placed on a holding device;

FIG. 10 perspective view of an edge of the cooking product carrier after it has been placed on a holding device;

FIG. 11 perspective view of a further embodiment of a baking oven,

FIG. 12 view of the oven of FIG. 11 with a cooking product carrier, and

Figure 13:
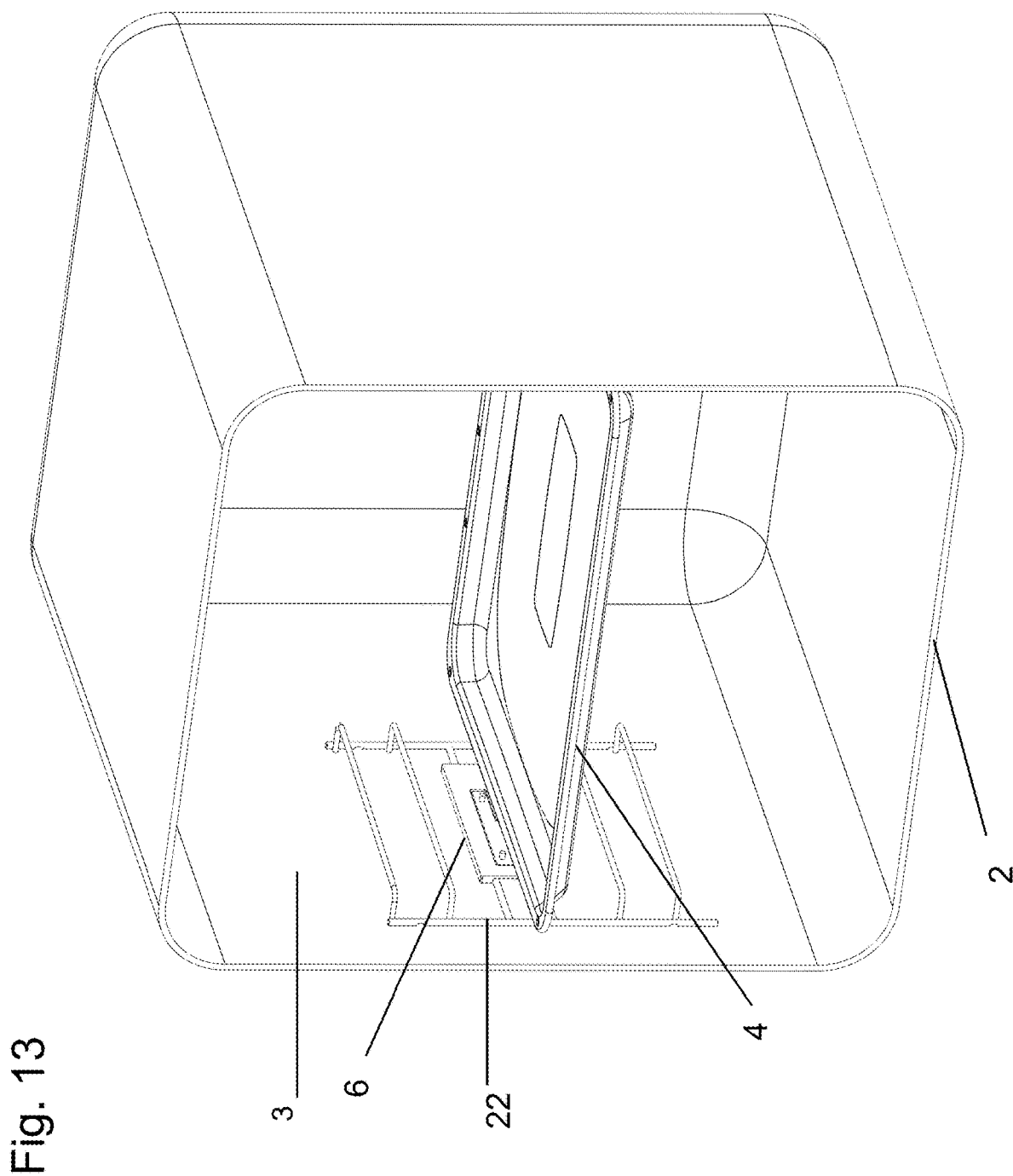

FIG. 13 view of the over with the cooking product carrier attached to a side rail.

A baking oven 1 comprises a baking oven muffle 2, on each of which a holding device 6 is provided on opposite side walls 3. The holding device 6 is used to secure a cooking product carrier 4, which has an edge 5 in engagement with the holding device 6 in the inserted position.

As can be seen in FIG. 2, a holding device 6 is located on a side wall 3 on opposite sides of the cooking product carrier 4. The holding device 6 comprises a support element 9 which is fixed directly to the side wall 3. It is of course also possible to fix the support element 9 to a side rail 22 as shown in FIG. 13 or a rail 21 of a pull-out guide 20 as shown in FIGS. 11 and 12.

A pivotable lever 7 with a holding section 8 is provided on the support element 9, wherein the holding section 8 engages over an edge 5 of the cooking product carrier 4 in the deposited position of the cooking tray 4 and secures the cooking product carrier 4 against lifting.

The holding device 6 is shown in detail in FIGS. 3 and 4. In FIG. 3, the holding device 6 is in an initial position in which the lever 7 is pivoted into a receiving position. The lever 7 can be pivoted about an axis of rotation 11 which extends parallel to the direction of insertion of the cooking product carrier 4. The lever 7 is biased into the receiving position by a spring 10, for example a leaf spring. As can be seen in the drawings, the spring 10 can be arranged above or below the axis of rotation 11 and be formed as a tension or compression spring. It is also possible to use leaf springs or torsion springs. At a distance from the holding section 8, the lever 7 comprises a support surface 12 on which an underside of the edge 5 of the cooking product carrier 4 can be placed. A support 13 is fixed to the support element 9 or the side wall 3 at a distance from the support surface 12. The lever 7 can also be formed in such a way that it automatically moves into the receiving position because of the weight force without an additional spring. Optionally, the lever 7 can also be latched in one or both end positions via latching means, for example via spring bars or other latching elements.

When the cooking product carrier 4 is moved downwards from the position shown in FIG. 3, an underside of the edge 5 comes into contact with the support surface 12 and presses the lever 7 into a deposited position in which the lever 7 is pivoted at an angle of between 5° and 60°, in particular between 15° and 45°, with the holding section 8 engaging over the edge 5. The cooking product carrier 4 can now be fully inserted into the baking oven muffle and rests with the edge 5 both on the support surface 12 and on the support 13. When the edge 5 is lifted vertically, it strikes the holding section 8. In particular, when the cooking product carrier 4 is moved to a position partially in front of the baking oven muffle 2, the holding section 8 can prevent the cooking product carrier 4 from tilting and being lifted backwards, as the holding section 8 limits such lifting. For this purpose, the supporting surface 12 can be arranged offset from the holding section 8 in the insertion direction, for example the holding section 8 can be arranged closer to a rear wall of the baking oven muffle than the supporting surface 12. The distance in the insertion direction can be more than 2 cm, for example between 5 cm to 20 cm.

If the cooking product carrier 4 is pulled out of the baking oven muffle 2 and then lifted or only lifted, the lever 7 of the holding device 6 moves back into the receiving position by the force of the spring 10.

FIG. 5 shows a second example of a baking oven 1 with a modified holding device 6'. The holding device 6' is arranged on opposite side walls 3 of the baking oven muffle 2, as shown in FIG. 6. The edge 5 of the cooking product carrier 4 is held in each case by a holding device 6', which comprises a pivotable lever 7'.

The modified holding device is shown in detail in FIGS. 7 and 8. The lever 7' is formed as a U-shaped lever which comprises a web-shaped holding section 8' and a web-shaped support surface 12' which are integral with the lever 7'. The lever 7' can be pivoted about an axis of rotation 11' between two end positions, whereby the axis of rotation 11' extends parallel to the direction of insertion. The axis of rotation 11' is arranged in the area of the movable holding section 8' on the side facing the side wall 3.

In FIG. 7, the lever 7' is shown in a receiving position in which a groove-shaped receptacle is open upwards to receive the edge 5 therein.

In FIG. 8, the cooking product carrier 4 and the lever 7' are arranged in a deposited position in which the edge 5 is arranged in the U-shaped receptacle of the lever 7' and rests with an underside on the support surface 12'. The upper side of the edge 5 is covered by the holding section 8'. Here, too, the supporting surface 12' can be arranged at a distance from the upper holding section 8' as seen in the insertion direction, in particular the supporting surface 12' can be further away from the rear wall of the baking oven muffle 2 than the holding section 8'.

The holding devices 6 or 6' can also be fixed to a rail of a pull-out guide instead of to the side wall 3. In addition, the holding devices 6, 6' can be arranged on a side grid in the baking oven muffle 2, whereby the side grids are optionally arranged stationary or displaceable in the baking oven muffle 2.

The fixing of a holding device 6' to a movable rail 21 of a pull-out guide 20 is shown for example in FIGS. 9 and 10. The holding device 6' is formed according to the holding device 6' of FIGS. 5 to 8. FIG. 9 shows the position of the holding device 6' before the cooking product carrier 4 is deposited, whereas FIG. 10 shows the cooking product carrier 4 and the lever 7' in a deposited position. The holding device 6' is attached to the movable rail 21 in a nondetachable or detachable manner, for example by welding, screwing or in some other way.

In the baking oven 1 according to the invention, which can also be formed as a microwave or as a combination device of a baking oven and microwave, an edge 5 of a cooking product carrier 4 can be supported on a movable running rail 21 of the pull-out guide 20 or on a movable side grid. In addition, a clamping device is provided which fixes the edge 5 of the cooking product carrier 4 in a clamping manner to the running rail 21 or to the movable side grid or to a cover on the running rail 21. This provides a non-positive or a combined non-positive and positive fixing of the cooking product carrier 4, which at least makes it more difficult for the cooking product carrier 4 to slip. The edge 5 of the cooking product carrier 4 can rest directly on the running rail 21, which is usually made of a bent metal sheet, or on a horizontal wire of the moving side grid, or, in the case of a microwave, a cover is preferably placed on the running rail 21 or permanently connected to it, so that the edge 5 of the cooking product carrier 4 is fixed to this cover.

FIG. 11 shows another embodiment of a baking oven 1 in which a holder 15 with a holding device 6 is fixed to a rear wall 16. As in the first embodiment, the holding device 6 comprises a pivotable lever 7 with a holding section 8 in the form of pins or projections. As shown in FIG. 12, the holding section 8 on the lever 7 engages over a rear edge 5 of the cooking product carrier 4 in the deposited position of the cooking product carrier 4 and secures the cooking product carrier 4 against lifting. This embodiment example can also be combined with the previous embodiment examples. The axis of rotation 11 of the lever 7 extends perpendicularly to the direction of insertion of the cooking product carrier 4.

The holding devices 6 and 6' are preferably made of metal, heat-resistant plastics or ceramics, and are sufficiently heat-resistant, for example also for pyrolysis operation.

LIST OF REFERENCE SIGNS

1 Oven
2 Oven muffle
3 Side wall
4 Cooking product carrier
5 Edge
6, 6' Holding device
7, 7' Lever
8, 8' Holding section
9 Support element
10 Spring
11, 11' Axis of rotation
12, 12' Support surface
13 Support
15 Holder
16 Rear wall
20 Pull-out guide
21 Movable rail

The invention claimed is:

1. A baking oven (1) comprising:
a baking oven muffle (2),
at least one support (13), on which a cooking product carrier (4) is supported, said at least one support being arranged at opposite sides (3) and/or at a rear wall (16) of the baking oven muffle (2), and
a holding device (6, 6') arranged on the at least one support (13), said holding device being configured to secure the cooking product carrier (4) against lifting, wherein the holding device (6, 6') comprises a movable holding section (8, 8') which in a deposited position of the cooking product carrier (4) on the support (13) engages over an edge (5) of the cooking product carrier (4),
wherein the movable holding section (8, 8') is arranged on a pivotable lever (7, 7') and
wherein the holding device (6, 6') comprises an axis of rotation (11, 11') for the lever (7, 7'), which is arranged on an outer side on a side of the holding device (6, 6') facing the side wall (3) of the baking oven muffle (2).

2. The baking oven according to claim 1, wherein the holding device (6, 6') in the deposited position of the cooking product carrier (4) engages around the edge (5) in a U-shape in a front view.

3. The baking oven according to claim 1, wherein the pivotable lever (7, 7') comprises a support surface (12) which is movable through an underside of the edge (5) when the cooking product carrier (4) is placed on it.

4. The baking oven according to claim 1, wherein the axis of rotation (11, 11') of the lever (7, 7') is aligned horizontally and parallel to a direction of insertion of the cooking product carrier (4) into the baking oven muffle (2).

5. The baking oven according to claim 1, wherein the lever (7, 7') is pivotable between a deposited position and a receiving position and the end positions are each limited by a stop.

6. The baking oven according to claim 5, wherein the lever (7,) is biased into the receiving position by at least one spring (10) or comes into the receiving position by gravity.

7. The baking oven according to claim 1, wherein the holding device (6, 6') comprises a support element (9) on which the lever (7, 7') is pivotably mounted.

8. The baking oven according to claim 1, wherein the holding device (6, 6') makes positive contact with the edge (5) of the cooking product carrier (4) in the deposited position of the cooking product carrier (4).

9. The baking oven according to claim 1, wherein the holding device (6, 6') is made of metal.

10. A baking oven (1) comprising:
a baking oven muffle (2),
at least one support (13), on which a cooking product carrier (4) is supported, is said at least one support being arranged at opposite sides (3) and/or at a rear wall (16) of the baking oven muffle (2), and
a holding device (6, 6') arranged on the at least one support (13), said holding device being configured to secure the cooking product carrier (4) against lifting, wherein the holding device (6, 6') comprises a movable holding section (8, 8') which in a deposited position of the cooking product carrier (4) on the support (13) engages over an edge (5) of the cooking product carrier (4),
wherein the holding device (6, 6') is fixed to a rail (21) of a pull-out guide (20).

11. A baking oven (1) comprising:
a baking oven muffle (2),
at least one support (13), on which a cooking product carrier (4) is supported, said at least one support being arranged at opposite sides (3) and/or at a rear wall (16) of the baking oven muffle (2), and
a holding device (6, 6') is arranged on the at least one support (13), said holding device being configured to secure the cooking product carrier (4) against lifting, wherein the holding device (6, 6') comprises a movable holding section (8, 8') which in a deposited position of the cooking product carrier (4) on the support (13) engages over an edge (5) of the cooking product carrier (4),
wherein the holding device (6, 6') is fixed to a side grid in the baking oven muffle (2).

* * * * *